US005751244A

United States Patent [19]
Huston et al.

[11] Patent Number: 5,751,244
[45] Date of Patent: *May 12, 1998

[54] METHOD AND APPARATUS FOR CALIBRATION OF A GPS RECEIVER

[76] Inventors: Charles D. Huston, 4607 Trail West Dr., Austin, Tex. 78735; Darryl J. Cornish, 8017 Davis Mountain Pass, Austin, Tex. 78726

[21] Appl. No.: 486,706

[*] Notice: The term of this patent shall not extend beyond the expiration date of Pat. No. 5,364,093.

[22] Filed: Jun. 7, 1995

Related U.S. Application Data

[63] Continuation-in-part of Ser. No. 804,368, Dec. 10, 1991, Pat. No. 5,364,093, Ser. No. 313,718, Sep. 22, 1994, abandoned, Ser. No. 334,733, Nov. 4, 1994, abandoned, and Ser. No. 366,994, Dec. 30, 1994.

[51] Int. Cl.$^6$ .............................. G01S 5/02; G01S 3/02; H04B 7/185
[52] U.S. Cl. ..................... 342/357; 342/358; 342/458
[58] Field of Search .................... 342/357, 457, 342/458, 358; 473/407; 364/449.7, 449.8, 449.9

[56] References Cited

U.S. PATENT DOCUMENTS

| 5,056,106 | 10/1991 | Wang et al. | 342/450 |
| 5,270,936 | 12/1993 | Fukushima et al. | 364/444 |
| 5,364,093 | 11/1994 | Huston et al. | 473/407 |

OTHER PUBLICATIONS

"RTCM Recommended Standards For Differential Navstar GPS Service", RTCM Special Committee #104, Jan. 1990.
GPS : A Guide To The Next Utility, Hurn, 1989, pp. 58–61.

Primary Examiner—Gregory C. Issing
Attorney, Agent, or Firm—Charles D. Huston

[57] ABSTRACT

The methods and apparatus of the present invention provides for determining accurate positions using a global positioning satellite system (GPS), either the United States Navstar or Russian Glonass, without the use of radio broadcast differential corrections. The method contemplates that selective availability (S/A) is either disabled or satellites with S/A active can be identified and not used. In one method, a GPS receiver is positioned at a reference location with a known position. The apparent position determined by the GPS receiver is then compared to the known position to determine an error correction. Preferably, the error correction is made to each satellite's pseudorange as a timing or range correction. When the GPS receiver moves, the error correction is applied to each satellite's pseudorange. The satellites used for position determination are chosen based on the "quality" of the satellite. Here, "quality" can mean the geometry of the satellite relative to the earth and the absence of SIA. With the combination of GPS and Glonass satellites to choose from, the four or five highest quality satellites are used for the position calculation. The method contemplates the addition of a new satellite to the current "quality" set of satellites being used for position determination. Range from the new satellite is compared to the range of the GPS receiver using the position based on the current "quality" set of satellites. Thus, a range correction for the new satellite is continuously computed. Once the new satellite is added to the "quality" set of satellites being used for position determination, the range correction is continuously applied to the new satellite to enhance accuracy.

14 Claims, 7 Drawing Sheets

REMOTE UNIT
S/A On?

Figure 7B

REMOTE UNIT
Corrected
Position

Figure 8

METHOD AND APPARATUS FOR CALIBRATION OF A GPS RECEIVER

The present invention is a continuation-in-part of Ser. No 804,368, filed Dec. 10, 1991, now U.S. Pat. Ser. No. 5,364,093 entitled "Golf Distance Measuring System and Method" and U.S. patent application Ser. Nos. 08/313,718 filed Sep. 22, 1994, now abandoned 08/334,733 filed Nov. 4, 1994 now abandoned, and 08/366,994 filed Dec. 30, 1994.

BACKGROUND OF THE INVENTION

1. Field of the Invention

The present invention relates to a method and apparatus for determining accurate positions using a global positioning satellite system (GPS), either the United States Navstar or Russian Glonass, without the use of radio broadcast differential corrections. In particular, the method and apparatus uses a global positioning satellite receiver positioned near the golf ball to determine the approximate location of the golf ball and the approximate distance between a golf ball and a target on the golf course such as the golf cup.

2. Description of Related Art

THE GLOBAL POSITIONING SATELLITE SYSTEM

The GPS system is an umbrella of satellites circling the earth passively transmitting signals. Each satellite has a very accurate atomic clock which is periodically updated. A GPS receiver with an accurate clock can identify a satellite and determine the transit time of the signal from the satellite to the receiver. Knowing the transit time and knowing that the speed of light is 186,000 miles per second enables a calculation of the distance from the satellite to the receiver. The signal carries with it data which discloses satellite position and time of transmission, and synchronizes the aircraft GPS system with satellite clocks.

If a GPS receiver can locate 3 or 4 satellites it can determine its distance from each satellite. The intersection of these 3 or 4 spheres enables a precise location of the receiver (and some compensation for timing errors in the receiver's internal clock). The GPS system should have 21 satellites and 3 spares once the system is fully deployed. Currently about 14 satellites are deployed, giving reasonable satellite coverage worldwide for most of the day.

There are basically two types of GPS receivers—P (precision) code and C/A (coarse availability) code. P code is for government use only and requires specialized equipment. C/A code receivers are becoming widely available with the continuing deployment of GPS satellites. One difficulty with C/A code receivers is that the government from time to time intentionally degrades the satellite signals—so called "selective availability." With selective availability turned on horizontal accuracy is on the order of 50-100 meters. With selective availability disabled horizontal accuracy can improve to around 15 meters.

The GPS Operational Constellation consists of 24 satellites: 21 navigational SVs and 3 active spares orbit the earth in 12 hour orbits. These orbits repeat the same ground track (as the earth turns beneath them) once each day. The orbit altitude is such that the satellites repeat the same track and configuration over any point approximately each 24 hours (4 minutes earlier each day). There are six orbital planes (with nominally four SVs in each) with the orbital planes inclined at about fifty-five degrees with respect to the polar plane. This constellation provides the user with between five and eight SVs visible from any point on the earth.

GPS receivers convert SV signals into position, velocity, and time estimates. Four satellites are required to compute the four dimensions of X, Y, Z (position) and Time.

The SVs transmit two microwave carrier signals. The L1 frequency (1575.42 MHz) carries the navigation message and the SPS code signals. The L2 frequency (1227.60 MHz) is used to measure the ionospheric delay by PPS equipped receivers. Three binary codes shift the L1 and/or L2 carrier phase.

The C/A Code (Coarse Acquisition) modulates the L1 carrier phase. The C/A code is a repeating 1 MHz Pseudo Random Noise (PRN) Code. This noise-like code modulates the L1 carrier signal, "spreading" the spectrum over a 1 MHz bandwidth. The C/A code repeats every 1023 bits (one millisecond). There is a different C/A code PRN for each SV.

GPS satellites are often identified by their PRN number, the unique identifier for each pseudo-random-noise code. The C/A code that modulates the L1 carrier is the basis for the civil SPS. The P-Code (Precise) modulates both the L1 and L2 carrier phases. GPS Data The GPS Navigation Message consists of time-tagged data bits marking the time of transmission of each subframe at the time they are transmitted by the SV. Three subframes contain orbital and clock data and repeat every six seconds. SV Clock corrections are sent in subframe one. Precise SV orbital data (ephemeris data parameters) for the transmitting SV is sent as subframes two and three Navigation Data Bits Clock data parameters describe the SV clock and its relationship to GPS time. Ephemeris data parameters describe SV orbits for short sections of the satellite orbits. The approximate orbital data is used to preset the receiver with the approximate position and carrier Doppler frequency (the frequency shift caused by the rate of change in range to the moving SV) of each SV in the constellation. Sample Almanac Parameters Each complete SV data set includes an ionospheric model that is used in the receiver to approximates the phase delay through the ionosphere at any location and time. Sample Ionospheric Parameters Each SV sends the amount to which GPS Time is offset from Universal Coordinated Time. This correction can be used by the receiver to set UTC to within 100 ns.

The GPS receiver produces replicas of the C/A and/or P (Y)-Code. Each PRN code is a noise-like, but predetermined, unique series of bits. PRN Code The receiver slides a replica of the code in time until there is correlation with the SV code. If the receiver applies a different PRN code to an SV signal there is no correlation. When the receiver uses the same code as the SV and the codes begin to line up, some signal power is detected. As the SV and receiver codes line up completely, the spread-spectrum carrier signal is de-spread and full signal power is detected. The receiver PRN code start position at the time of full correlation is the time of arrival (TOA) of the SV PRN at the GPS receiver. This TOA is a measure of the range to SV offset by the amount to which the receiver clock is offset from GPS time. This TOA is called the pseudo-range.

The position of the receiver is where the pseudo-ranges from a set of SVs intersect. The intersection of range spheres position is determined from multiple pseudo-range measurements at a single measurement epoch. The pseudo-range measurements are used together with SV position estimates based on the precise orbital elements (the ephemeris data) sent by each SV. This orbital data allows the receiver to compute the SV positions in three dimensions at the instant that they sent their respective signals. Four satellites (normal navigation) can be used to determine three position dimensions and time. Position dimensions are computed by the receiver in Earth-Centered, Earth-Fixed X, Y, Z (ECEF XYZ) coordinates. ECEF X, Y, and Z Time is used to correct the offset in the receiver clock, allowing the use of an inexpensive receiver clock. SV Position in XYZ is computed from four SV pseudo-ranges and the clock correction and ephemeris data.

Position in XYZ is converted within the receiver to geodetic latitude, longitude and height above the ellipsoid. ECEF XYZ. Geodetic Coordinates latitude and longitude are usually provided in the geodetic datum on which GPS is based (WGS-84). Receivers can often be set to convert to other user-required datums. Position offsets of hundreds of meters can result from using the wrong datum. Time is computed in SV Time, GPS Time, and UTC. SV Time is the time maintained by each satellite. Each SV contains four atomic clocks (two cesium and two rubidium). SV clocks are monitored by ground control stations and occasionally reset to maintain time to within one-millisecond of GPS time. Clock correction data bits reflect the offset of each SV from GPS time. SV Time is set in the receiver from the GPS signals. Data bit subframes occur every six seconds and contain bits that resolve the Time of Week to within six seconds. The 50 Hz data bit stream is aligned with the C/A code transitions so that the arrival time of a data bit edge (on a 20 millisecond interval) resolves the pseudo-range to the nearest millisecond. Approximate range to the SV resolves the twenty millisecond ambiguity, and the C/A code measurement represents time to fractional milliseconds. Multiple SVs and a navigation solution (or a known position for a timing receiver) permit SV Time to be set to an accuracy limited by the position error and the pseudo-range error for each SV. SV Time is converted to GPS Time in the receiver.

GPS Error Sources

GPS errors are a combination of noise, bias, blunders. Noise, Bias, and Blunders Noise errors are the combined effect of PRN code noise (around 1 meter) and noise within the receiver noise (around 1 meter). Bias errors result from Selective Availability and other factors. Selective Availability (SA) is the intentional degradation of the SPS signals by a time varying bias. SA is controlled by the DOD to limit accuracy for non-U. S. military and government users. The potential accuracy of the C/A code of around 30 meters is reduced to 100 meters (two standard deviations). The SA bias on each satellite signal is different, and so the resulting position solution is a function of the combined SA bias from each SV used in the navigation solution. Because SA is a changing bias with low frequency terms in excess of a few hours, position solutions or individual SV pseudoranges cannot be effectively averaged over periods shorter than a few hours. Differential corrections must be updated at a rate less than the correlation time of SA (and other bias errors).

Several methods for determining if an individual SV has SA active have been published. For example, Georgiadou Y. and K. D. Doucet, "The issue of Selective Availability," GPS World, Vol. 1, No. 5, pp. 53–56, 1990; R. Langley, "The Mathematics of GPS" July/August 1991, GPS World (Vol. 2, No. 7, pp. 45–50)

Other Bias Error sources; SV clock errors uncorrected by Control Segment can result in one meter errors. Ephemeris data errors: 1 meter Tropospheric delays: 1 meter. The troposphere is the lower part (ground level to from 8 to 13 km) of the atmosphere that experiences the changes in temperature, pressure, and humidity associated with weather changes. Complex models of tropospheric delay require estimates or measurements of these parameters. Unmodeled ionosphere delays: 10 meters. The ionosphere is the layer of the atmosphere from 50 to 500 km that consists of ionized air. The transmitted model can only remove about half of the possible 70 ns of delay leaving a ten meter un-modeled residual. Multipath: 0.5 meters. Multipath is caused by reflected signals from surfaces near the receiver that can either interfere with or be mistaken for the signal that follows the straight line path from the satellite. Multipath is difficult to detect and sometime hard to avoid. Blunders can result in errors of hundred of kilometers. Control segment mistakes due to computer or human error can cause errors from one meter to hundreds of kilometers. User mistakes, including incorrect geodetic datum selection, can cause errors from 1 to hundreds of meters. Receiver errors from software or hardware failures can cause blunder errors of any size.

Noise and bias errors combine, resulting in typical ranging errors of around fifteen meters for each satellite used in the position solution.

Geometric Dilution of Precision (GDOP)

GPS ranging errors are magnified by the range vector differences between the receiver and the SVs. The volume of the shape described by the unit-vectors from the receiver to the SVs used in a position fix is inversely proportional to GDOP. Poor GDOP, a large value representing a small unit vector-volume, results when angles from receiver to the set of SVs used are similar. Good GDOP, a small value representing a large unit-vector-volume, results when angles from receiver to SVs are different. Good GDOP is computed from the geometric relationships between the receiver position and the positions of the satellites the receiver is using for navigation. GDOP terms are usually computed using parameters from the navigation solution process.

Without S/A, 30 meter accuracy is obtainable. In many applications, however, it is desirable to obtain accuracy greater than 30 meters, preferably less than 3–5 meters. Even without S/A, conventional wisdom is that accuracies less then 3–5 meter are only obtainable with radio broadcast differential corrections.

SUMMARY OF THE INVENTION

The present invention provides methods and apparatus for obtaining accurate positions less than 3–5 meters without radio broadcast differential corrections. Because S/A cannot be compensated for in real-time, the invention contemplates either: S/A is not active; or the S/A active satellites are identified and not used while S/A is active. Use of the GPS satellites and Glonass satellites permits selection and use of the satellites with the best geometry and more satellites in the position calculation.

Broadly speaking the method for determining the approximate distance of a golf ball to a green location using the global positioning satellite system includes: storing the position of the green location; determining an error correction for the global positioning satellite system; positioning said remote global positioning satellite receiver near the golf ball; determining a position of the remote receiver using the global positioning satellite system and said error correction; and determining the distance from the remote receiver to the green location using the stored green position and the error corrected position of the remote receiver.

The method of calibrating a GPS satellite range signal for errors, includes the steps of: selecting a first set of GPS satellites from the GPS satellites in view; positioning a GPS receiver at a reference location having a known position; determining an apparent position of said GPS receiver at said reference location using said first set of GPS satellites; calculating a position error correction based on the difference between said known position and said apparent position; repositioning said GPS receiver at a second location having an unknown position; determining a corrected position of said GPS receiver at said second location based on said apparent position of said GPS receiver at said second location and said position error correction; selecting another GPS satellite not a member of said first set of GPS satellites; determining an apparent range of said GPS receiver positioned at said second location to said other GPS satellite; calculating an estimated range from said GPS receiver positioned at said second location to said other satellite using said corrected position; and calculating a range error correction for said other GPS satellite based on the difference between said estimated range and apparent range.

The method of calibrating a GPS receiver for accurately determining the position of said receiver as it moves, comprises: positioning said GPS receiver at a reference location having a known position; determining an apparent position of said GPS receiver at said reference location; comparing said reference location position with the apparent position; determining an error correction based on said comparison between said known position and apparent position; positioning said GPS receiver at a second location having an unknown position; determining a second apparent position of said GPS receiver at said second location; and determining an estimated position of said GPS receiver at said second location based on said second apparent position and said error correction.

BRIEF DESCRIPTION OF THE DRAWINGS

FIG. 7 comprises the flow charts illustrating the operation of a remote unit accordance with the system of the present invention, where

DESCRIPTION OF THE PREFERRED EMBODIMENTS

Figure 1:
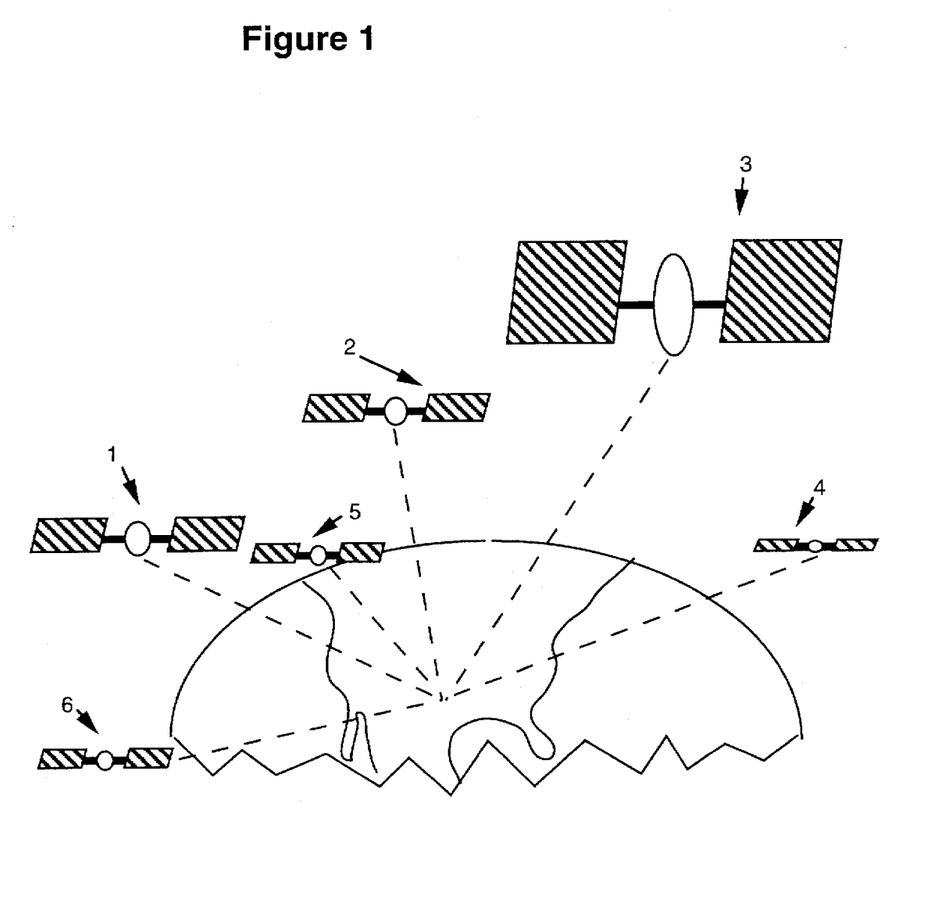
FIG. 1 schematically illustrates the geometry of GPS and Glonass satellites in relation to the earth.
Figure 2:
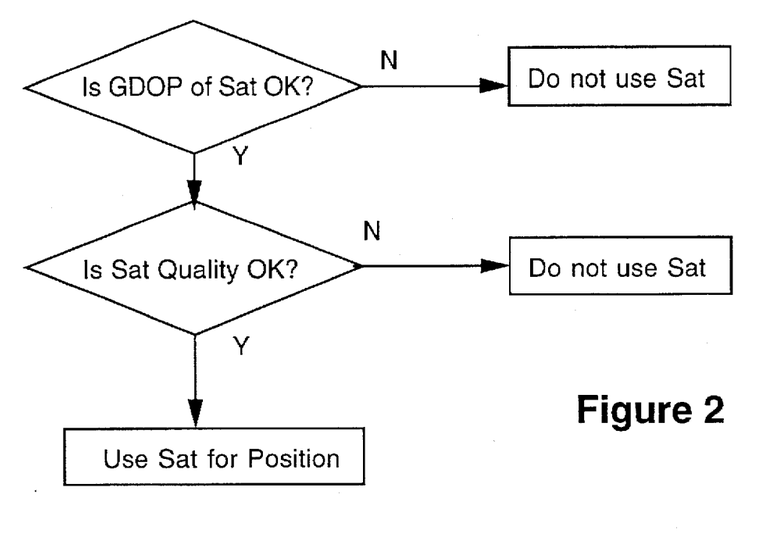
FIG. 2 is a flow chart depicting the operation of the method for qualifying a satellite for use.
Figure 3:
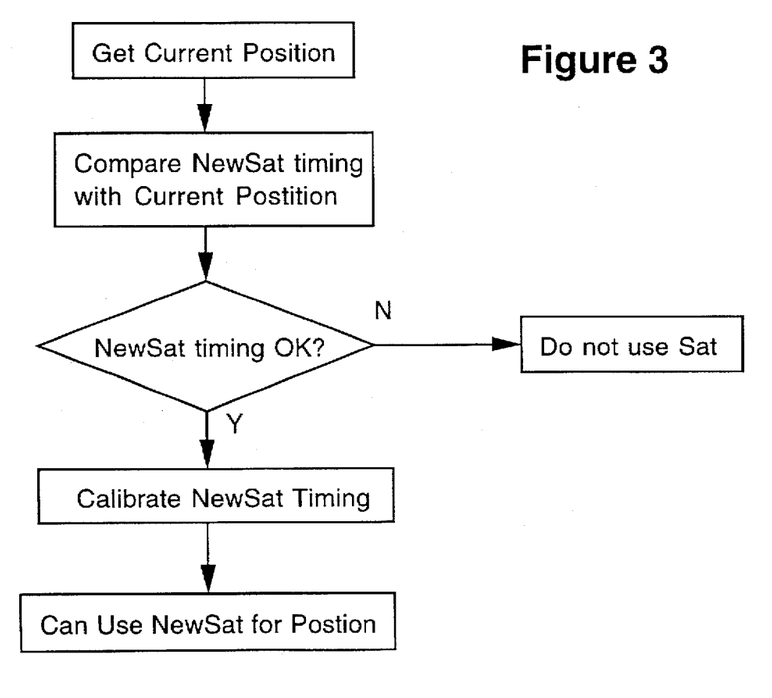
FIG. 3 is a flow chart depicting the method for calibrating a new satellite.

The present invention utilizes a global positioning satellite system, such as Navstar or Glonass (GPS) to determine the approximate distance from a golf ball to hole features, such as the cup or pin on the green of the golf hole being played. GPS is a spaced based system of satellites which can provide to an infinite number of receivers accurate three dimensional position (i.e. horizontal location and altitude), velocity, and time. A general understanding of GPS is useful to appreciate the operation of the present invention. Numerous books and articles are available on GPS operation and theory. See e.g., GPS—A Guide to the Next Utility, Trimble Navigation (incorporated by reference for background).
GENERAL OPERATION Turning to FIG. 1, a number of GPS satellites (SV1–6) are shown. The satellites 1–6 can be from either the U.S. GPS constellation or the Russian Glonass. If selective availability is disabled, any of the satellites can potentially be used in the set of satellites used to determine position. If selective availability is active, the satellites with S/A active are identified and disregarded. A certain geometry of satellites is desired, generally speaking, satellites at different angles to the position and high on the horizon are preferred.

Once a set of satellites is selected for use in position determination, an error correction is determined. This error correction is preferably determined by positioning the GPS receiver at a reference location having a known position. The known position is then compared with the apparent position calculated from the current set of satellites selected for use. The comparison yields an error correction that is good for a short period of time in the general area of the reference location using the current set of satellites.

Preferably, the current set of satellites and error correction are used for position determinations until a new calibration can be performed at the same or another reference location. If this is not possible, another satellite (meeting the geometry and non S/A restrictions) can be added to the set of satellites, usually replacing a satellite in the previous set. This can occur when the time (or distance) between calibrations is such that a satellite in the current set leaves the field of view, geometry degrades, or S/A becomes active.

This dynamic calibration of a new satellite is performed by first determining a corrected position of the GPS receiver. This corrected position is obtained by determining an apparent position and applying the current error correction. Second, a range from the corrected position to the new satellite is computed. Next, a pseudorange from the new satellite to the GPS receiver is determined using the conventional GPS technique. Finally, the pseudorange is compared to the computed range to derive a range correction to the pseudorange.

PREFERRED EMBODIMENTS

Figure 4:
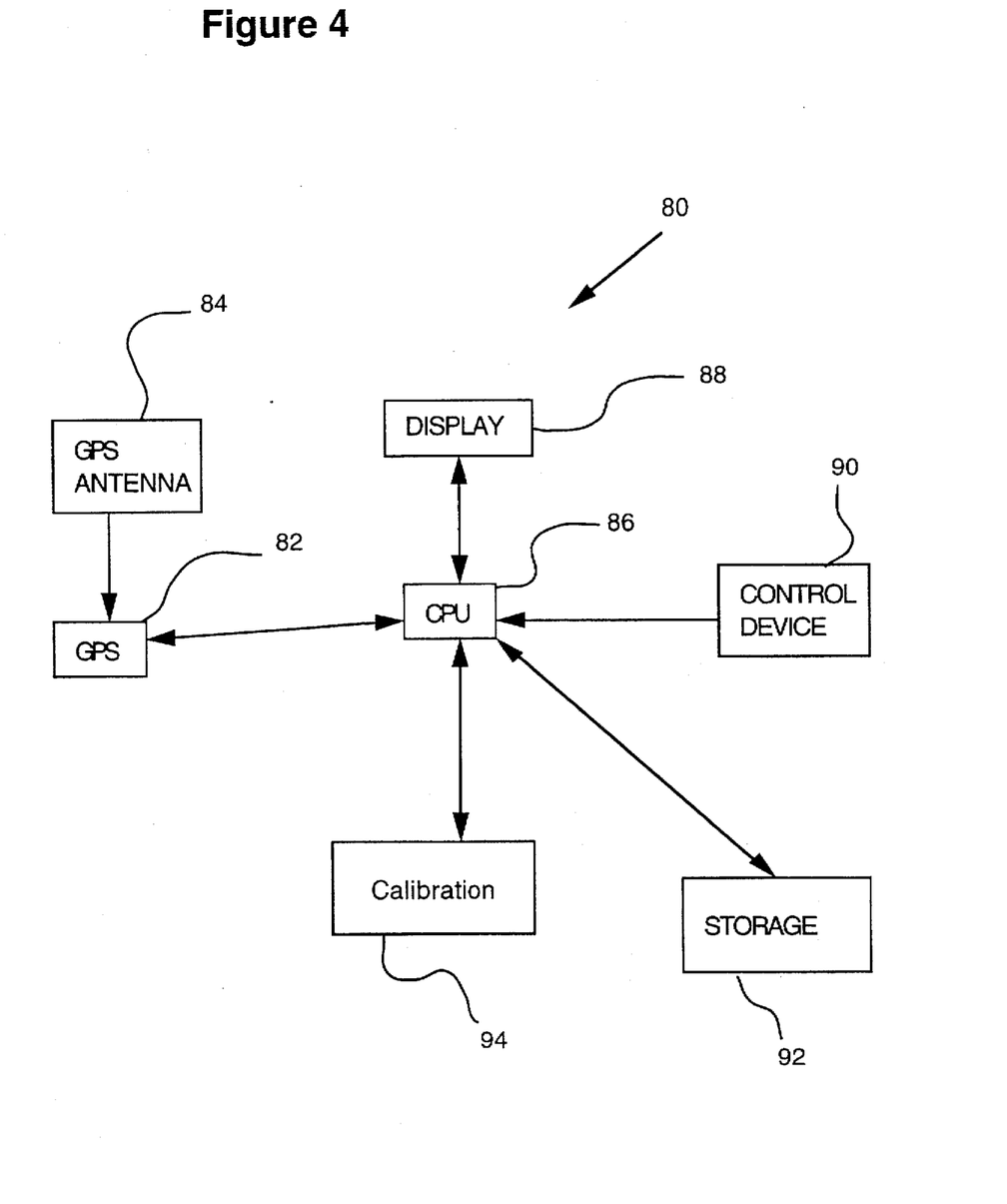
FIG. 4 is a block diagram describing an alternative embodiment of the remote unit which includes an internal calibration mechanism.
Figure 5:
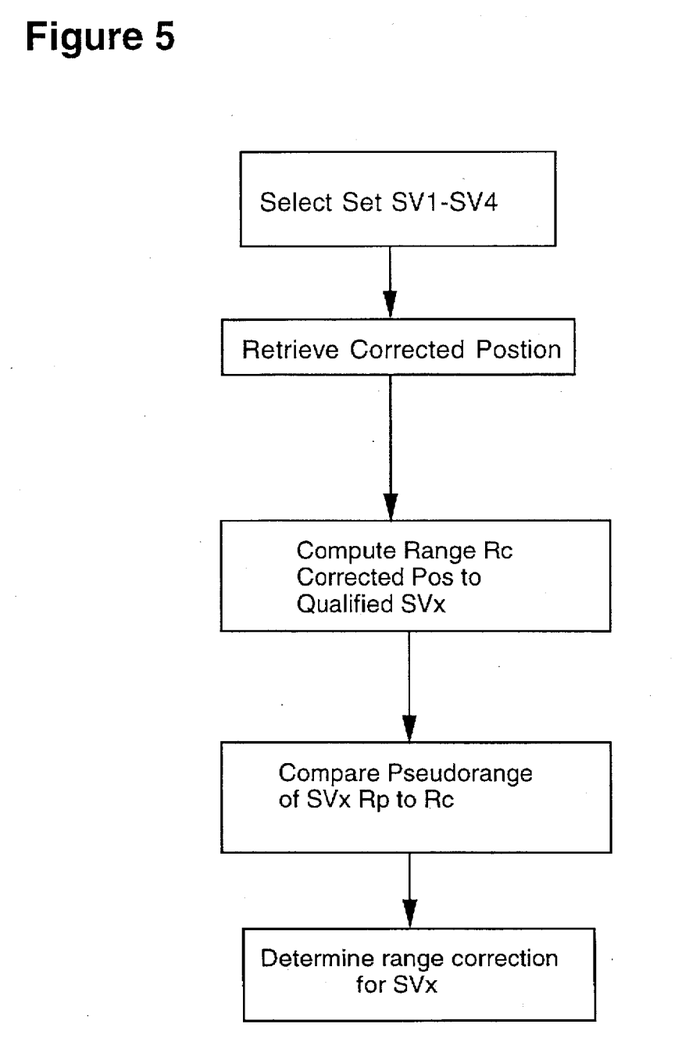
FIG. 5 is a flow chart for determining a range correction for a satellite SV.

FIG. 4 illustrates an embodiment of a remote unit 80 which is preferably mounted on a golf cart. In the system of FIG. 4 a base station for generating and transmitting differential corrections is eliminated as well as the packet radio system on the golf cart. The remote unit 80 includes a GPS receiver 82, GPS antenna 84, CPU 86, display 88, control device 90, storage 92 and calibration 94. The GPS receiver 82 is preferably the multi-channel receiver such as the SV-6 Model made by Trimble Navigation of Sunnyvale, Calif. Other commercially available substitutes are acceptable such as made by Magellan or Rockwell/Collins. The antenna 84 is either remote or internal to the receiver 82, but in any event is mounted on the golf cart for an upward look angle for optimum GPS signal reception.

Figure 8:
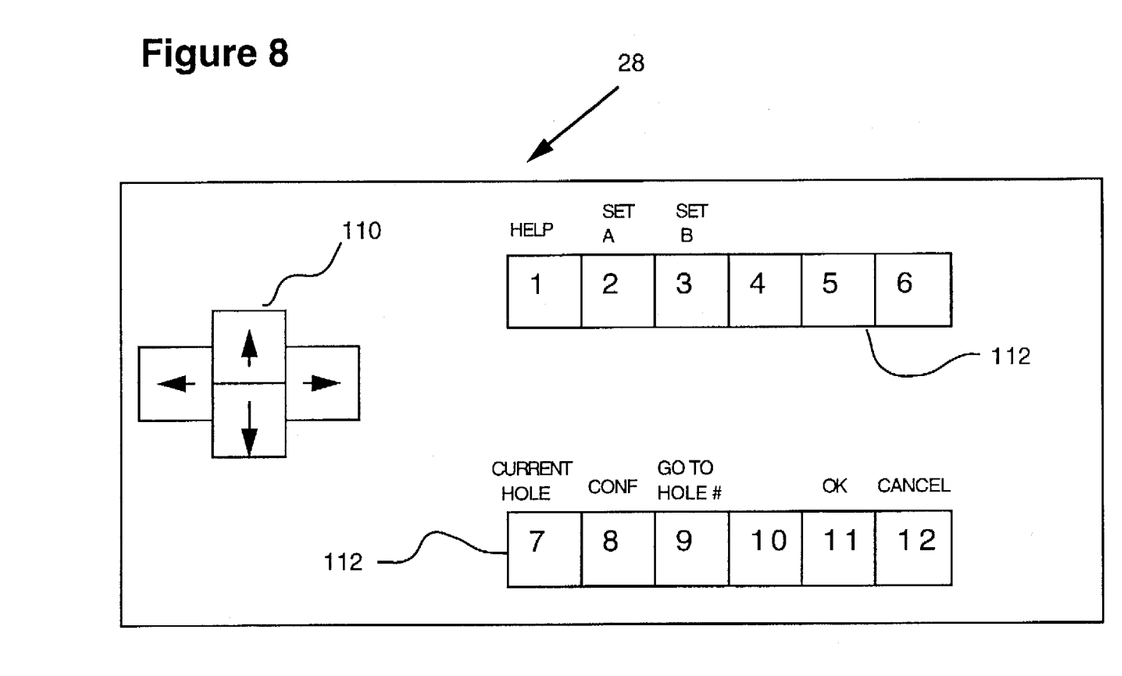
FIG. 8 depicts the layout the control panel of the remote unit.

In particular, the storage 92 similarly contains a course geography database, but in addition contains the location of a calibration location for each hole. Such a calibration location is preferably a placard on the ground in the cartpath adjacent the tee box for the hole being played. In the alternative embodiment, a control device like FIG. 8 is used with keypad "6" being additionally labeled with the notation "Calibrate," The calibrate box 94 in FIG. 4 is preferably EEPROM and contains the calibration routine of FIG. 6. Of course the calibration routine could alternatively be stored in Storage 92.

Preferably, the present position of the cups for each hole is loaded in the course geography database in storage 92. Alternatively, a nominal green location can be used, e.g.

center of the green. The device of FIG. 4 can be used as a cup locator by placing the device over or near a cup and determining an apparent position of the cup. The cup locations are stored and transferred to the remote unit 80. Without calibration and with a C/A code receiver 82, the remote unit 80 will give distance accuracies within 100 meters (S/A enabled) and within 30 meters (S/A disabled). Of course technical improvements in GPS technology might improve on this accuracy to some degree.

Figure 6:
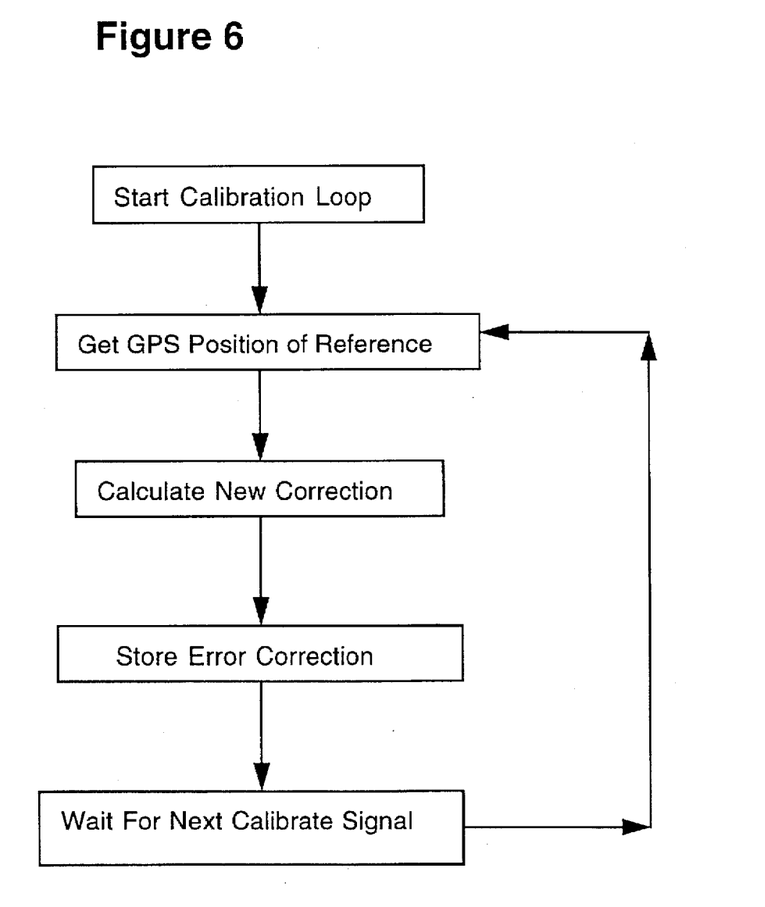
FIG. 6 is a flow chart depicting the operation of the calibration sequence for determining the error correction.
Figure 7A:
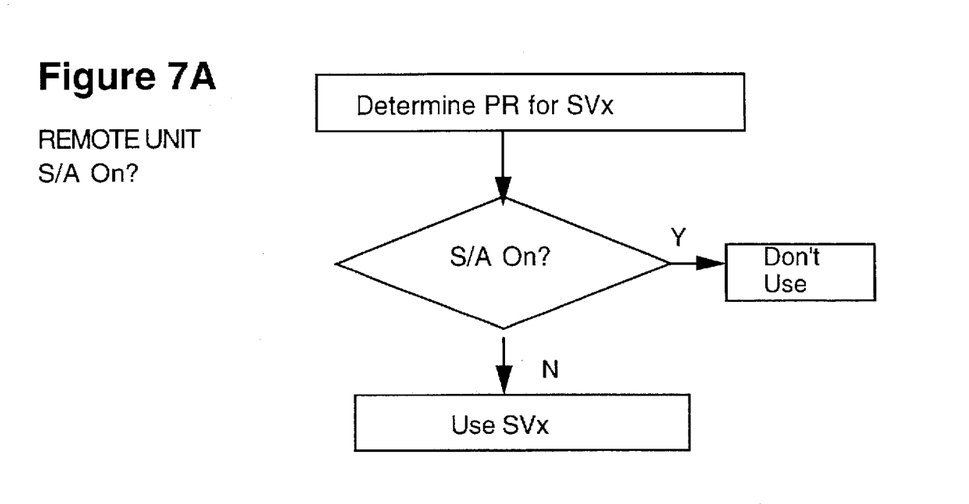
FIG. 7A is a flow chart of the S/A checking method.
Figure 7B:
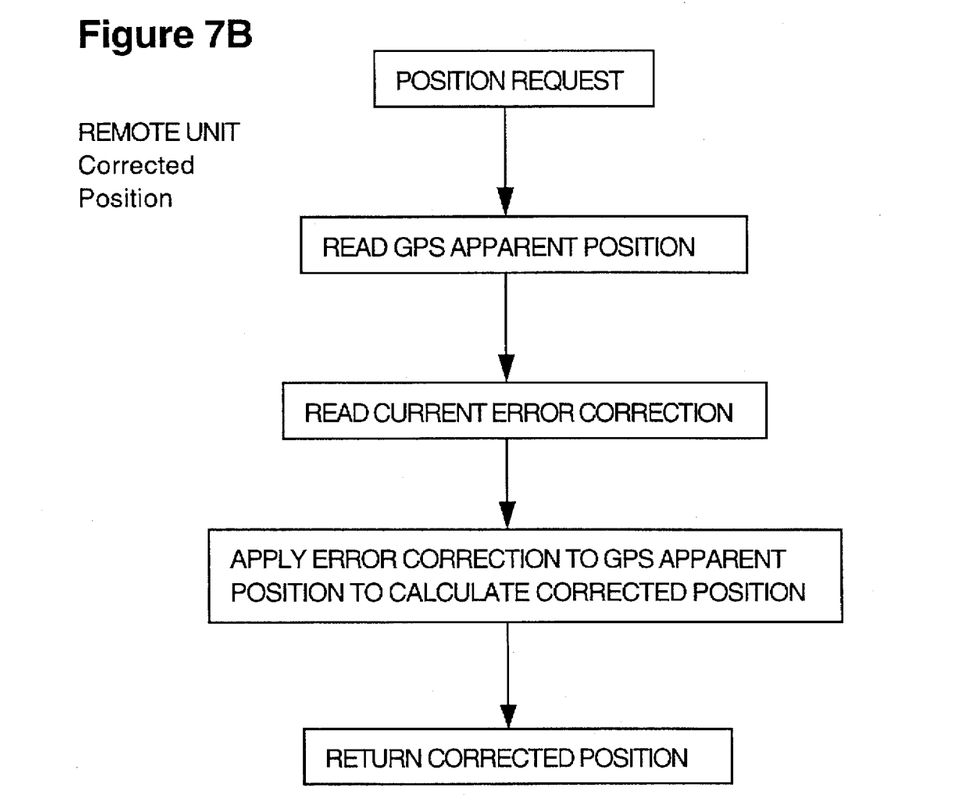
FIG. 7B is a flow chart of the method for determining the corrected position of the remote unit.

To improve these accuracies a calibration procedure is utilized. The golfer (or greenskeeper determining cup positions) places the remote unit 80 over a placard in the cart path marking a "reference" location with a known position. Typically, the golfer drives the golf cart containing the remote unit 80 over the placard, calls up the display for the hole being played, and presses "Calibrate" pad 6 of FIG. 8. The routine of FIG. 6 is initiated, and an error correction is determined by comparing the current apparent GPS position with the GPS position stored for the hole placard. This calibrate procedure gives a reasonably accurate error correction for the duration of play for the hole. If a player forgets to calibrate for a hole the previous error correction is simply carried over and applied.

It should be appreciated that the methods of the present invention are not confined to applications on the golf course. In particular, the methods are most useful where the remote GPS receivers move slowly within a confined area (e.g. 10 km) and the time between calibrations is as short as possible—desirably less than 15 minutes.

ALTERNATIVES

Many alternatives exist without departing from the scope of the present invention and a few are worth mention. In one alternative the golfer need not physically press a "calibrate" pad as in FIG. 8. Rather, an alignment transponder is placed on the path and triggers the calibration routine whenever a cart drives over the designated calibration spot. Indeed, the golfer need not even know a calibration spot is being transited.

Typically, an error correction is applied to the timing signal for each satellite being used to obtain a corrected pseudorange for each satellite in the set. However, a vector position correction can alternatively be used, but the accuracy is not believed to be as desirable.

Another embodiment could easily use another input source that would permit the calibration of new satellites, even while moving. Examples include accelerometers, gyros, flux gate compasses, and altimeters.

We claim:

1. A method of calibrating a GPS receiver for accurately determining the position of said GPS receiver as it moves, comprising the steps of:
   a) positioning said GPS receiver at a reference location having a known position;
   b) determining an apparent position of said GPS receiver at said reference location using a first set of GPS satellites;
   c) comparing said reference location known position with the apparent position;
   d) determining an error correction based on said comparison between said known position and apparent position;
   e) positioning said GPS receiver at a second location having an unknown position;
   f) determining a second apparent position of said GPS receiver at said second location using only satellites from said first set of GPS satellites; and
   g) determining an estimated position of said GPS receiver at said second location based on said second apparent position and said error correction.

2. The method of claim 1, said error correction comprising a correction to each satellite ranging signal.

3. The method of claim 1, said error correction comprising a vector correction of the difference between the apparent position and known position.

4. The method of claim 1, said determining apparent position steps b and f including the substep of selecting certain satellites from said first set of satellites for use.

5. The method of claim 4, including qualifying a satellite for selection in said first set if selective availability is not active in said satellite.

6. The method of claim 4, including the step of determining an error correction for another GPS satellite for inclusion in a second set of satellites including at least some of said first set of GPS satellites, comprising the substeps of
   determining an apparent range of said GPS receiver positioned at said second location to said other GPS satellite,
   calculating an estimated range from said GPS receiver positioned at said second location to said other satellite using said estimated position, and
   calculating a range error correction for said other GPS satellite based on the difference between said estimated range and apparent range.

7. A method of determining a range error correction for a certain GPS satellite, comprising the steps of:
   selecting a first set of GPS satellites, not including said certain GPS satellite, from the GPS satellites in view of a GPS receiver;
   providing a predetermined range error correction for each GPS satellite in said first set;
   positioning said GPS receiver at a first, unknown location;
   determining an apparent position of said GPS receiver at said first location using said first set of GPS satellites;
   calculating a corrected position of said GPS receiver based on said apparent position and predetermined range error corrections; calculating a computed range from said GPS receiver positioned at said first location to said certain GPS satellite using said corrected position;
   determining an apparent range of said GPS receiver positioned at said first location to said certain GPS satellite, and
   calculating a range error correction for said certain GPS satellite based on the difference between said computed range and apparent range.

8. The method of claim 7, said selecting step comprising determining the geometry of the GPS satellites relative to said receiver and selecting the first set of GPS satellites having the highest geometric degree of precision.

9. The method of claim 7, said selecting step comprising determining if selective availability is active on a satellite and not including the satellite in the first set of GPS satellites if selective availability is active.

10. The method of claim 7, including the steps of
   positioning said GPS receiver at a second location,
   selecting a second set of GPS satellites including some of said satellites comprising said first set and including said certain GPS satellite,
   determining an apparent position of said GPS receiver at said second location, and
   determining a computed position of said GPS receiver at said second location by applying said range error corrections to said apparent position.

11. The method of claim 10, said second set of GPS satellites consisting only of said certain GPS satellite and a plurality of satellites from said first set.

12. The method of claim 7, said providing step including the substep of positioning said GPS receiver at a reference location comprising a calibration area on a golf course, and manually inputting to the GPS receiver that the GPS receiver is positioned within the calibration area.

13. A system for accurately determining a position of a GPS receiver movable about a predefined navigational area comprising:

a reference location having a known position within the navigational area;

said GPS receiver including means for determining when said receiver is positioned at said reference location, means for determining an apparent position when said receiver is positioned at said reference location using a first set of GPS satellites, and for determining a range error correction for each satellite in said first set based on the difference between said apparent position and said known position, means for calculating a computed position of the GPS receiver at a second location by applying said range error corrections, comprising, means for determining an apparent position of said receiver at said second location using only GPS satellites selected from said first set, means for adjusting said apparent position by applying said range error corrections to calculate said computed position.

14. The system of claim 13, said reference location comprising a calibration location in a golf cart staging area on a golf course, said navigational area comprising a golf course, and said GPS receiver reference location determining means including a calibration input device for manually indicating whether said GPS receiver is positioned at the calibration location.

* * * * *